(No Model.) 9 Sheets—Sheet 2.
D. H. CHURCH.
MACHINE FOR RECESSING WATCH MOVEMENT PLATES.
No. 522,930. Patented July 10, 1894.
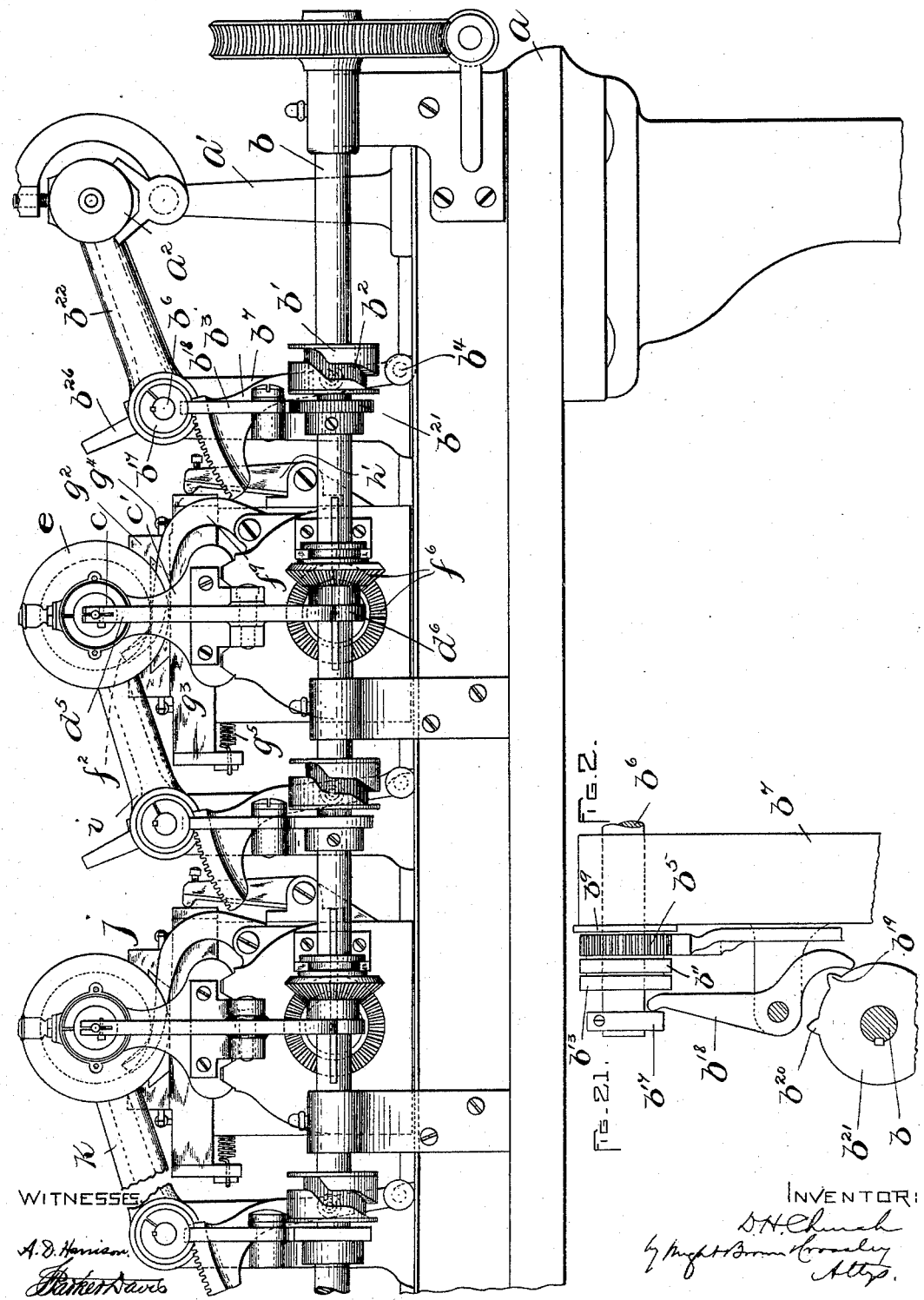

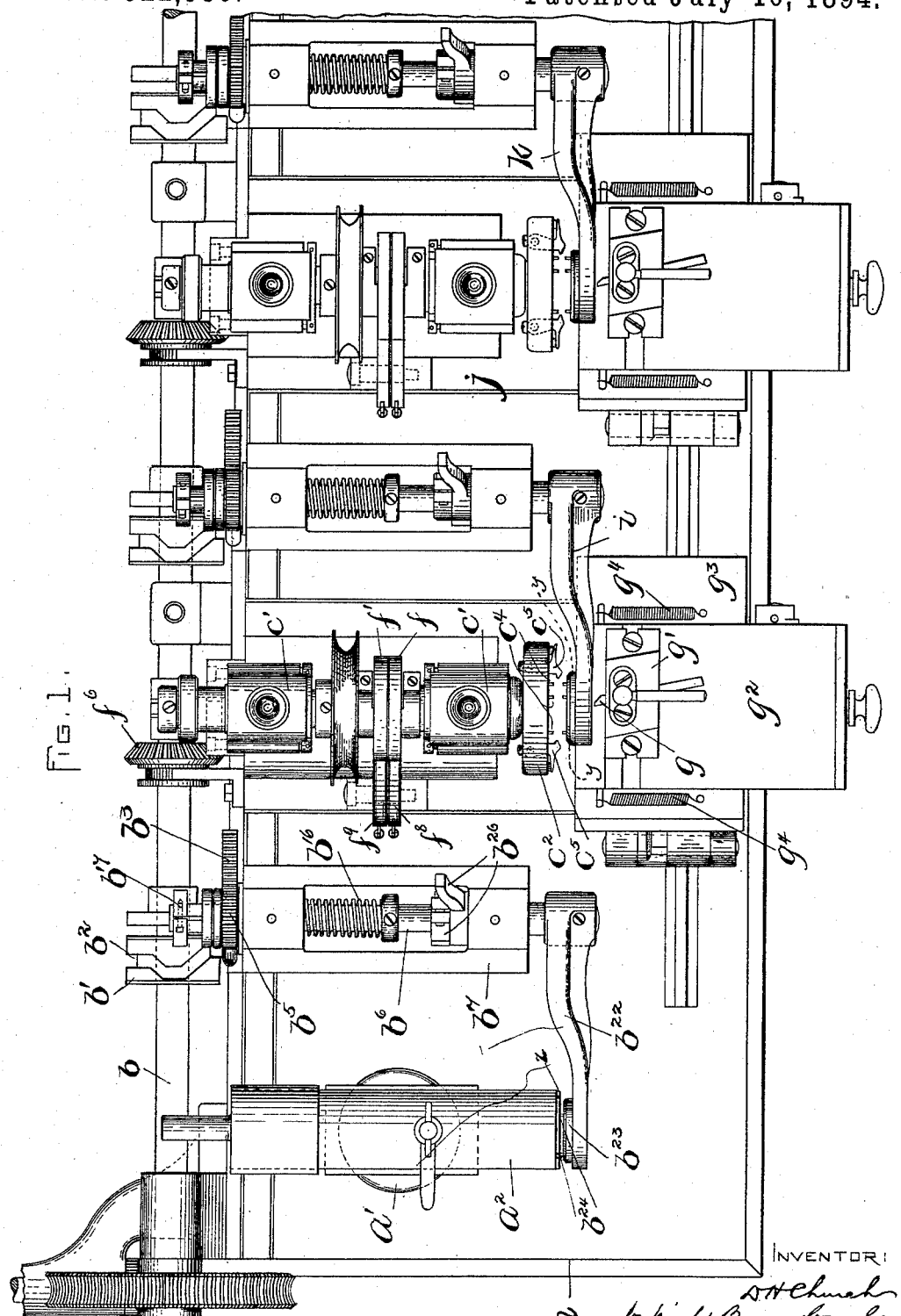

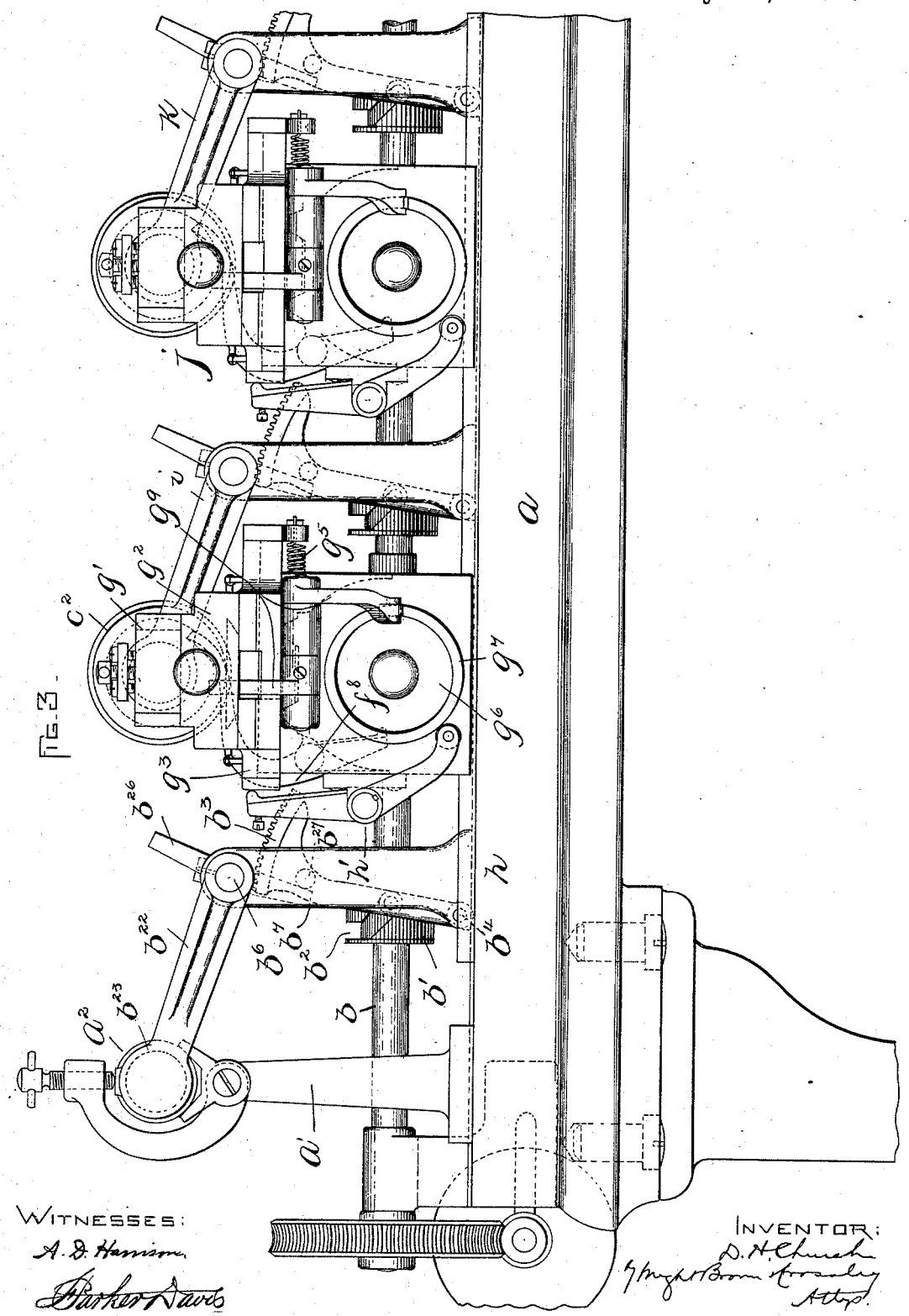

(No Model.) 9 Sheets—Sheet 4.
D. H. CHURCH.
MACHINE FOR RECESSING WATCH MOVEMENT PLATES.
No. 522,930. Patented July 10, 1894.
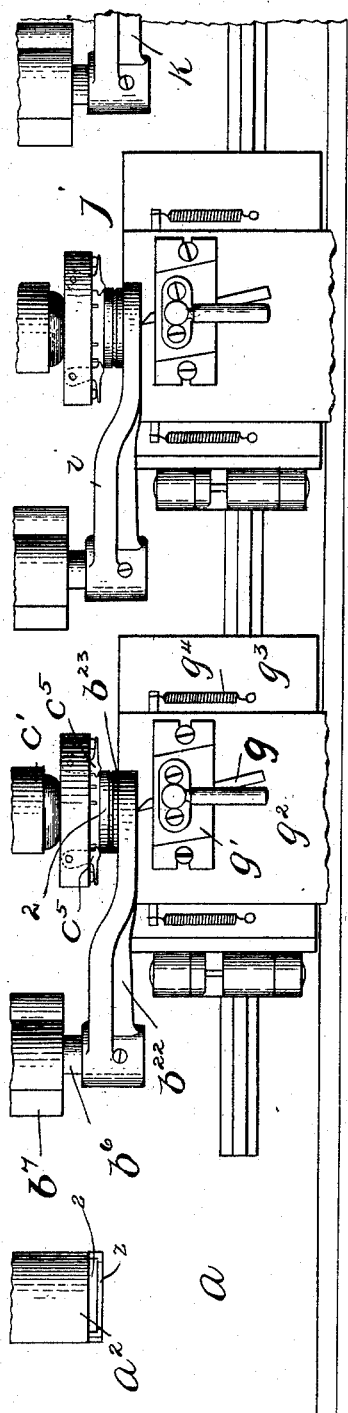
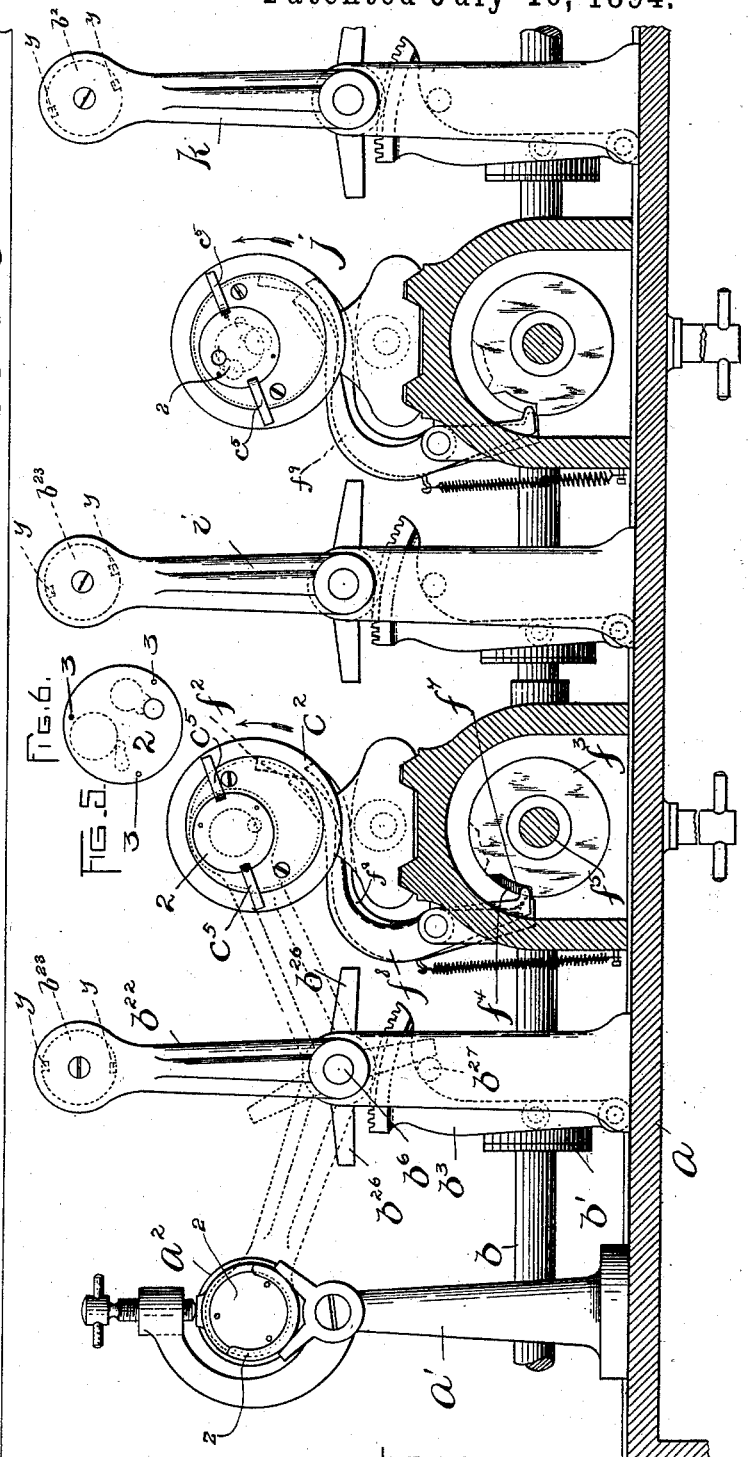
WITNESSES:
INVENTOR:

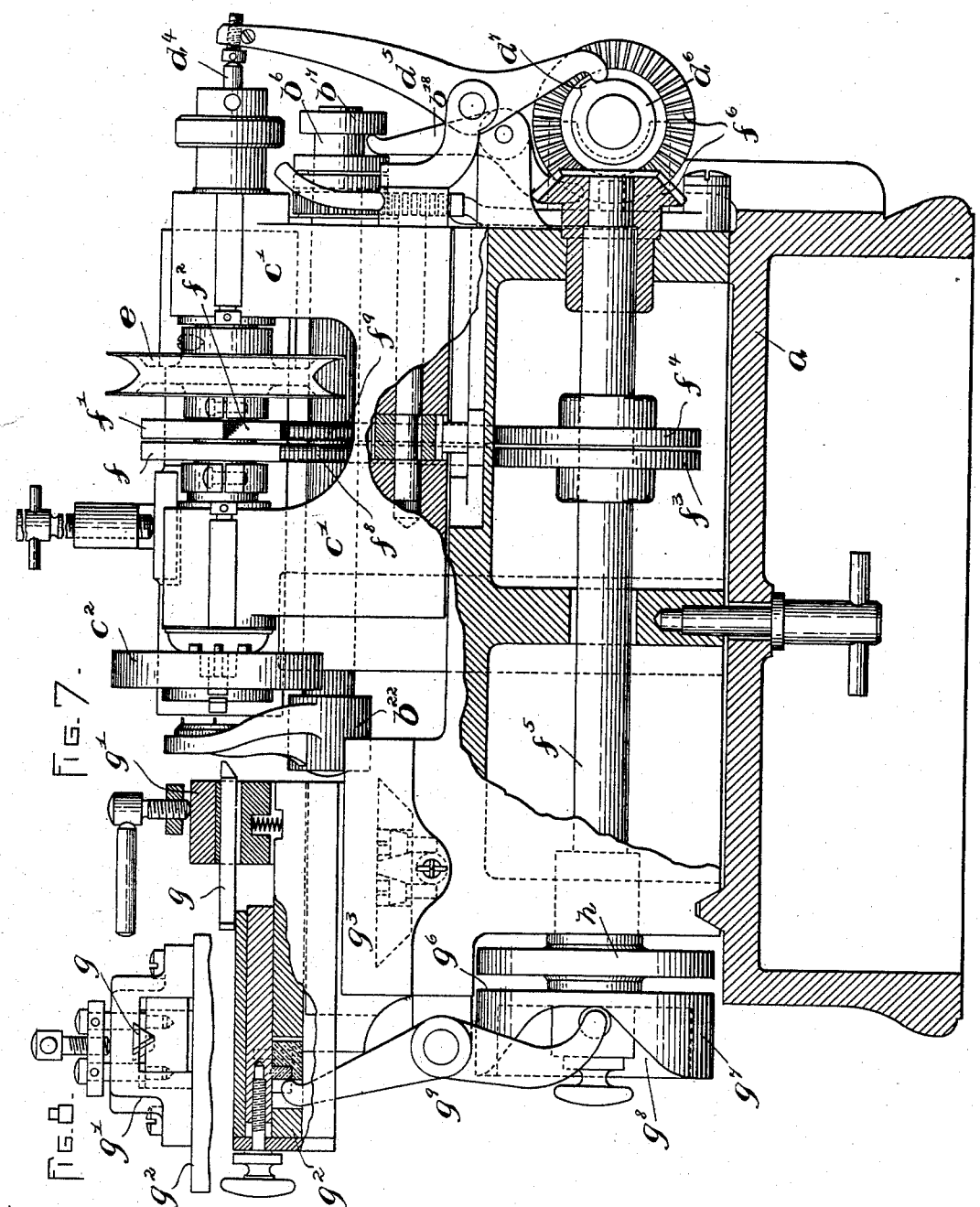

(No Model.) 9 Sheets—Sheet 6.
D. H. CHURCH.
MACHINE FOR RECESSING WATCH MOVEMENT PLATES.
No. 522,930. Patented July 10, 1894.
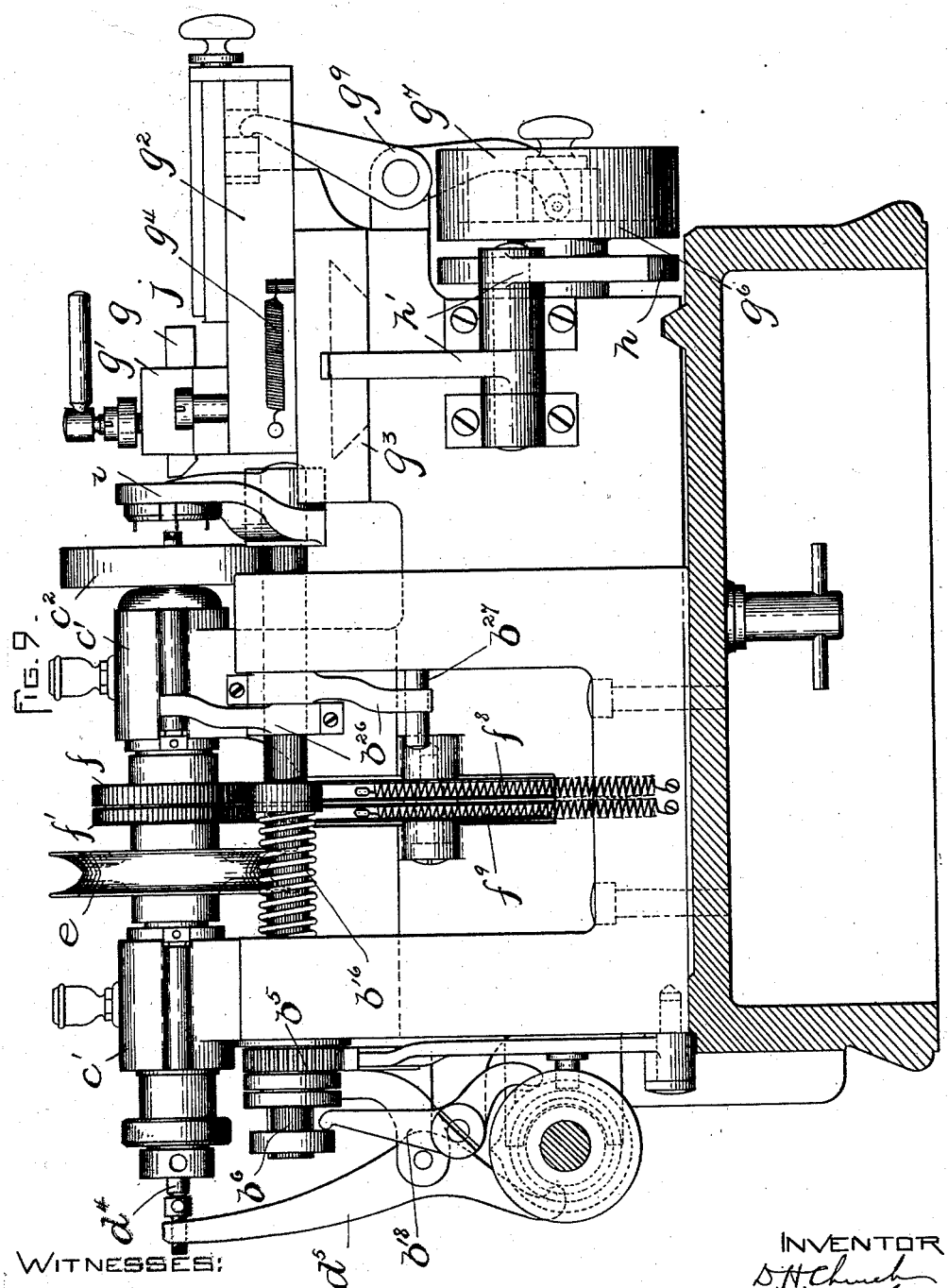
WITNESSES:
INVENTOR:

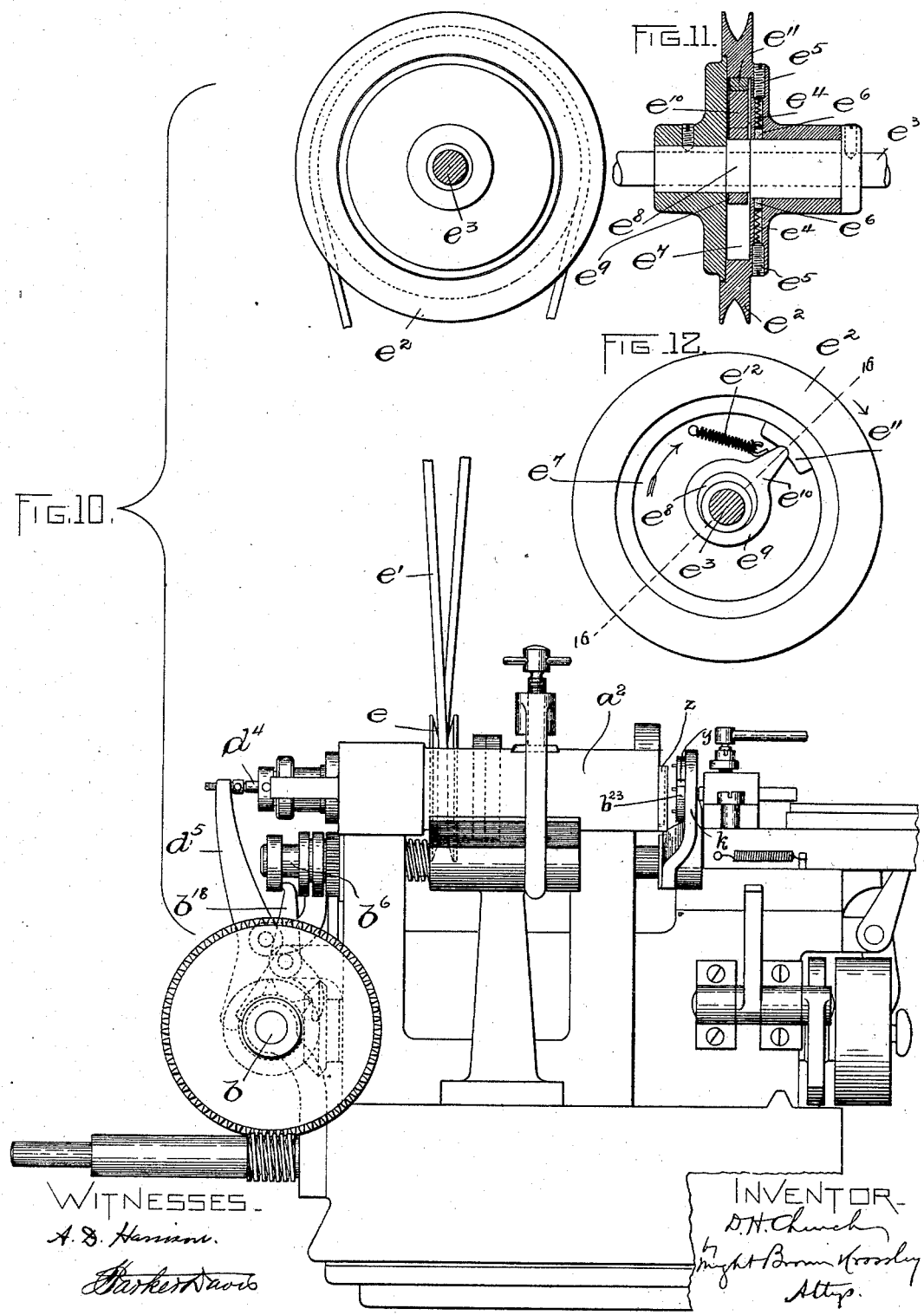

(No Model.)
9 Sheets—Sheet 8.
D. H. CHURCH.
MACHINE FOR RECESSING WATCH MOVEMENT PLATES.
No. 522,930.
Patented July 10, 1894.
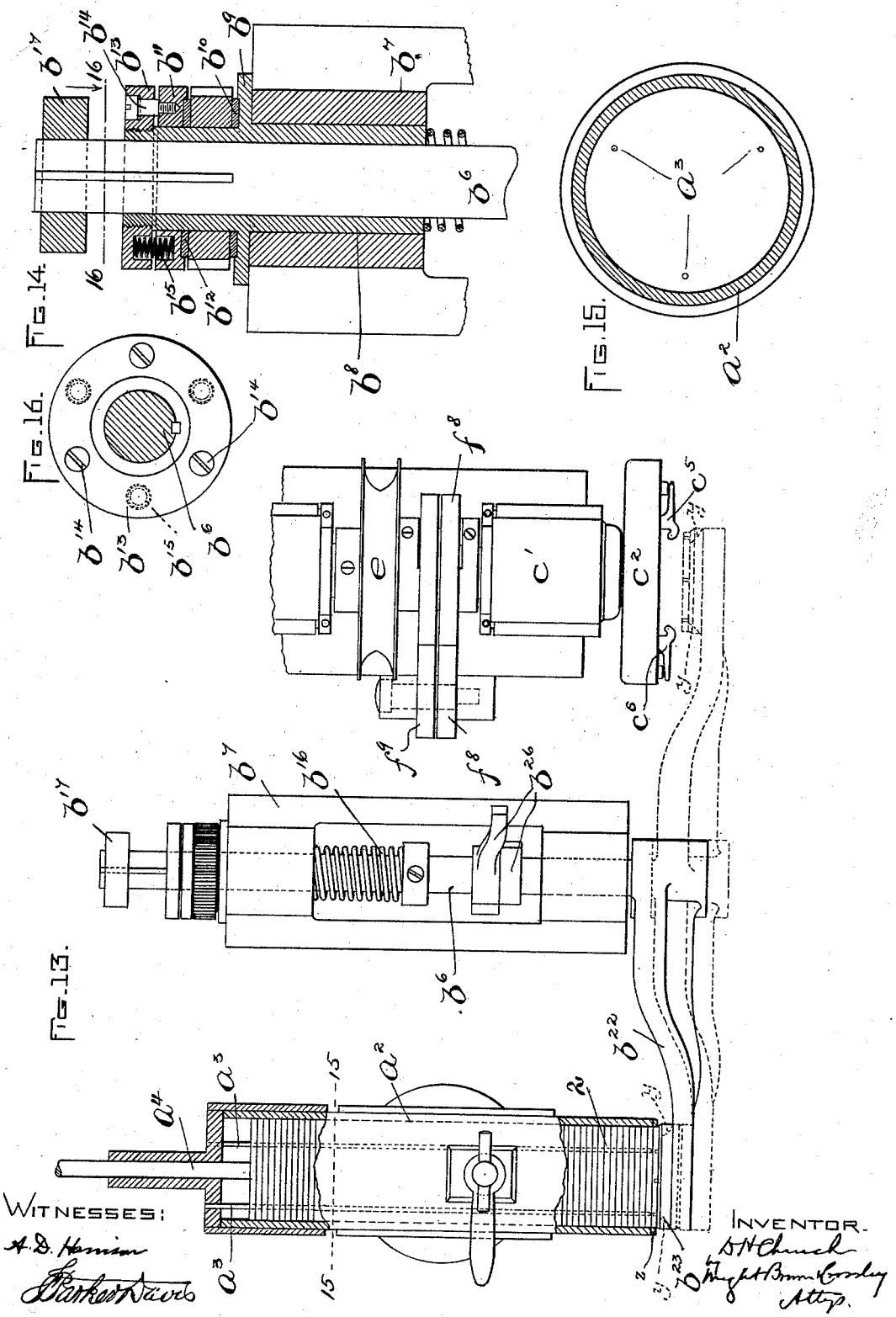
Witnesses:
Inventor.

(No Model.) 9 Sheets—Sheet 9.
D. H. CHURCH.
MACHINE FOR RECESSING WATCH MOVEMENT PLATES.
No. 522,930. Patented July 10, 1894.
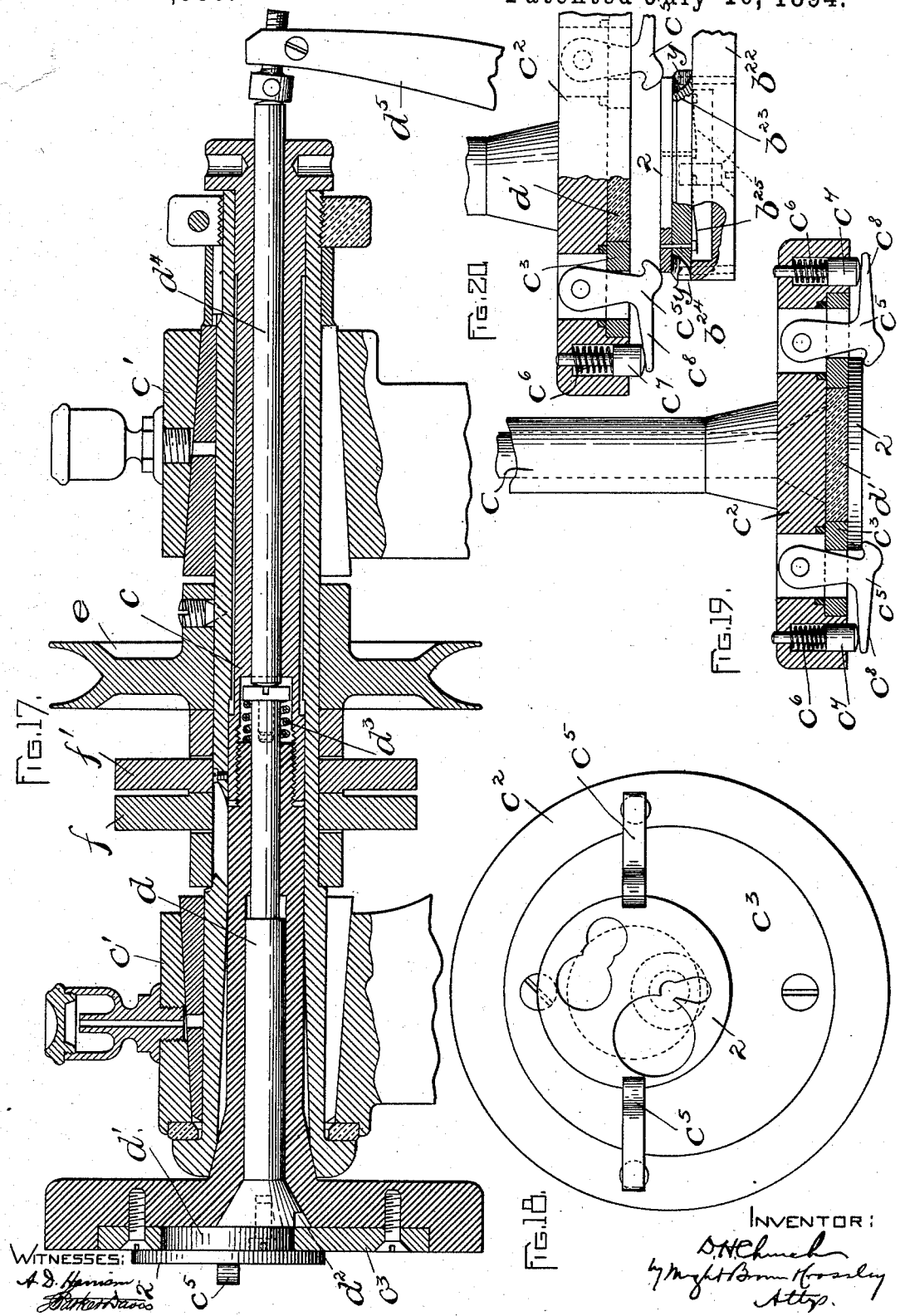
INVENTOR:
D. H. Church

UNITED STATES PATENT OFFICE.

DUANE H. CHURCH, OF NEWTON, MASSACHUSETTS.

MACHINE FOR RECESSING WATCH-MOVEMENT PLATES.

SPECIFICATION forming part of Letters Patent No. 522,930, dated July 10, 1894.

Application filed September 25, 1893. Serial No. 486,459. (No model.)

*To all whom it may concern:*

Be it known that I, DUANE H. CHURCH, of Newton, in the county of Middlesex and State of Massachusetts, have invented certain new and useful Improvements in Machines for Recessing Watch-Movement Plates, of which the following is a specification.

The object of the present invention is to provide an organized machine, in which may be placed a stack of blanks for watch-movement plates, and from which such plates will emerge recessed in full, so that no handling of the plates is necessary from the time they are placed in the machine until they leave the same.

In view of the fact that the recesses of a watch-plate are made at a number of points in the plate and eccentric with respect thereto, a machine designed to automatically recess the plate necessarily involves, and this invention therefore consists essentially in, a recessing lathe, whose rotary work-holder or chuck has provisions for receiving the work when said holder arrives at a predetermined point in its rotation, and a carrier which delivers the work at such point and previously positioned to bring the center of the intended recess coincident with the lathe-center.

The accompanying drawings illustrate an organized machine embodying the invention.

Figure 1 shows a top plan view of the machine. Fig. 2 shows a rear elevation. Fig. 3 shows a front elevation. Fig. 4 shows a partial top plan, illustrating the carriers in the act of introducing the plates into the chucks. Fig. 5 shows a partial front elevation and partial section, with the carriers in their intermediate positions after having introduced the plates into the chucks. Fig. 6 shows one of the plates after the first recess is formed, and with a dotted representation of the other recesses to be formed. Fig. 7 shows a partial side elevation and section. Fig. 8 shows a detail end view of the tool-carriage. Fig. 9 shows a side elevation. Fig. 10 shows an end elevation. Fig. 11 shows a sectional detail of a frictional driving device. Fig. 12 shows a side view of the same. Fig. 13 shows a detail top plan view of parts appearing at the left of Fig. 1, the supply receptacle or reservoir being broken away and shown partly in section. Fig. 14 shows an enlarged sectional detail of frictional driving means. Fig. 15 shows a section on line 15—15 of Fig. 13. Fig. 16 shows a section on line 16—16 of Fig. 14. Fig. 17 shows an enlarged longitudinal section of the spindle and appurtenances of one of the recessing mechanisms. Figs. 18, 19 and 20 show details of the chuck of such mechanism and illustrate the manner of introducing a plate thereinto. Fig. 21 shows a detail of parts appearing at the left of Fig. 9.

The same letters and numerals of reference indicate the same parts in all the figures.

In the drawings: the letter $a$ designates the supporting-bed of the machine, on which is erected a standard $a'$, supporting a horizontal barrel $a^2$, constituting a supply-receptacle or reservoir for the blanks 2, which are in the form of circular disks, each having three holes 3. Within the said barrel three parallel rods $a^3$ are fastened, and the plates are strung on these rods and held thereby in a certain position. The front end of the barrel is open, and the rear end is closed, and the blanks may be fed forward intermittently by a plunger $a^4$, connected with some suitable actuating means, or by a charge of compressed fluid periodically admitted.

A stop-piece $z$, affixed to the front of the barrel $a^2$, prevents the blanks from being pushed out of the same, but permits them to be removed singly in an upward direction.

The main driving-shaft $b$ extends longitudinally of the machine, and carries affixed to it a disk $b'$, having a cam-groove $b^2$ in its periphery, which groove is engaged by a roll on a segment $b^3$, pivoted to the bed $a$ at $b^4$, and meshing with a small gear $b^5$ on a rock-shaft $b^6$, which is supported in a bearing $b^7$ on the bed. The gear $b^5$ is frictionally connected with the shaft, as best illustrated in Fig. 14.

A sleeve $b^8$ surrounds the shaft, and is splined thereto, and rests in the bearing $b^7$, and said sleeve is formed with a flange $b^9$, between which and the gear $b^5$ a frictional gasket $b^{10}$ is interposed, said gear being loosely mounted on the sleeve. A ring $b^{11}$ is fitted over the sleeve on the opposite side of the gear, with a frictional gasket $b^{12}$ between it and the gear, and a nut $b^{13}$ is screwed on the sleeve and united to the ring $b^{11}$ by screws $b^{14}$, so that the ring is caused to turn with said nut, but may play longitudinally of the shaft, and springs $b^{15}$ tend to press the ring $b^{11}$ away from the nut. The shaft may slide longitudinally in the sleeve $b^8$, and is actuated toward the front of the machine by a spring $b^{16}$. The shaft carries a collar $b^{17}$ at its rear end, and a bell-crank lever $b^{18}$ engages behind said collar and is pivoted to a stationary support on the bed $a$, and said lever is actuated at certain periods to draw back the shaft $b^6$ by a pair of cam-projections $b^{19}$ and $b^{20}$, on a disk $b^{21}$, which is affixed to the shaft $b$ and against the periphery of which the lever $b^{18}$ bears.

An arm $b^{22}$ is affixed to the front end of the shaft $b^6$, and carries a circular head $b^{23}$ at its outer end and adapted to stand in front of the barrel $a^2$ and receive the plates 2 therefrom, one by one. Said circular head carries three pins $b^{24}$ to receive and hold a plate by engagment with the openings 3 therein, and the said pins are yieldingly supported, as shown in Fig. 20, being fitted to slide in the head $b^{23}$ and projected from the face thereof by springs $b^{25}$.

Stops $b^{26}$ are adjustably fastened to the shaft $b^6$, and limit its rotary movement by encountering a pin $b^{27}$, fastened in the bearing $b^7$. One of the stops is adjusted so that, when it abuts the pin, the head on the end of the arm $b^{22}$ is positioned exactly right to receive a plate from the barrel $a^2$; and the other stop is adjusted so that, when it abuts the pin, the said head on the arm is positioned exactly right to deliver the plate to the holder or chuck of a recessing mechanism, which will next be described.

A spindle $c$ is supported in bearings $c'$ on the bed $a$, and has a circular head $c^2$ at its forward end, which head carries a circular plate $c^3$, fitting a recess in it and having three pins $c^4$ to receive the plate 2.

Catches $c^5$ are pivoted to the head $c^2$, and project through slots in the plate $c^3$, and have hook-shaped ends adapted to take over the plate 2 and hold it in place. Said catches are actuated inward by springs $c^6$, acting on push-pieces $c^7$, which bear against heels $c^8$ formed on the catches. By pressing the plate 2 against the outer beveled ends of the catches, they are spread apart and the plate passes the hook-shaped ends which spring over it, the head $b^{23}$ having notches $y$, which accommodate the catches.

The spindle is hollow, and is occupied by a sliding rod $d$, which carries at its outer end a circular head $d'$, fitting an opening in the plate $c^3$. This sliding rod and head constitute a pusher to remove the plate 2 under treatment from the chuck, and this pusher is normally retracted by a spring $d^3$. A rod $d^4$ occupies part of the bore of the spindle, and bears against the rod $d$, and said rod $d^4$ projects from the rear end of the spindle, and is engaged by the upper end of a lever $d^5$, whose lower end bears on the periphery of a disk $d^6$, having a cam-projection $d^7$. At the proper time, the projection $d^7$, by acting against the lever $d^5$, throws forward the pusher. The spindle is rotated positively in one direction when the recessing is in progress, and frictionally in the opposite direction to bring the chuck to the proper position for receiving or discharging the plate. The means employed to accomplish this are shown in Figs. 10, 11 and 12, and may be described as follows: A pulley $e$ is fixed to the spindle, and is connected by a belt $e'$ with a driving-pulley $e^2$ supported above it, and loose on a counter-shaft $e^3$. The pulley $e^2$ has a hub, which is bored to receive springs $e^4$ and screws $e^5$, and the springs bear against frictional shoes $e^6$ carried by the pulley and in contact with the shaft, and sufficient friction exists between said shoes and the shaft to cause the rotation of the pulley with the shaft in the absence of sufficient resistance to prevent this. The pulley is provided with a circular recess $e^7$, and the shaft carries an eccentric $e^8$ within said recess. A band $e^9$ on the eccentric has an arm $e^{10}$ carrying a shoe $e^{11}$, adapted to engage the wall of the recess and positively connect the shaft and pulley under one direction of rotation indicated by the arrow in Fig. 12, such direction of rotation of the shaft causing the eccentric to bind the shoe against the wall of the recess. It will be seen that rotation of the shaft in the opposite direction breaks this connection. In the absence of resistance, however, the friction between the shaft and the shoes $e^6$ causes the pulley to rotate with the shaft. A spring $e^{12}$ tends to draw the shoe $e^{11}$ back and break the connection between it and the pulley.

A pair of disks $f$ and $f'$ are affixed side by side on the spindle, and each is notched to form a shoulder $f^2$. A pair of disks $f^3$ and $f^4$ are affixed side by side on a cross-shaft $f^5$ supported in bearings below the spindle and connected with the main shaft $b$ by bevel-gears $f^6$ and each of said disks has an elongated notch $f^7$ in its periphery. A pair of bent levers $f^8$ and $f^9$ are pivoted side by side to a stationary support and at their lower ends bear against the peripheries of the disks $f^3$ and $f^4$ respectively, while at their upper ends they bear against the peripheries of the disks $f$ and $f'$ respectively. While the spindle is revolving positively and the recessing is in progress, the shoulders $f^2$ in the disks $f$ and $f'$ pass the levers $f^8$ and $f^9$ without obstruction.

The object of the above described construction is to establish certain positive positions of the chuck for receiving and discharging the plates. To secure these positions of the chuck, the rotation of the shaft $e^3$ is reversed from its positive direction of rotation, and hence that of the spindle is reversed, and the spindle is stopped by the shoulder $f^2$ of one of the disks $f$ $f'$ coming against one of the levers $f^8$ $f^9$. The shoulder of one disk fixes the position of the chuck for receiving the plate, while the shoulder of the other disk fixes the position of the chuck for discharging the plate. The operative position of the levers $f^8$ and $f^9$ is controlled by the disks $f^3$ and $f^4$. While the lever $f^8$ has its lower end in the notch $f^7$ of the disk $f^3$, its upper end is in the path of the shoulder $f^2$ of the disk $f$, and at this time the other lever $f^9$ is thrown out of the path of the shoulder in the disk $f'$ by the engagement of its lower end with the periphery of the disk $f^4$. By the rotation of the disks $f^3 f^4$, this condition is reversed. This provision is made so as to insure action of the right lever at the right time in checking the spindle and holding the chuck.

The recessing-tool $g$ is given a longitudinal or parallel feed sufficient to permit the head $b^{23}$ to enter in front of the chuck, an additional feed equal to the depth of the recess, and a lateral or cross-feed equal to the radius of the recess. Said tool is carried in a holder $g'$, which is fastened to a carriage $g^2$, movable longitudinally on another carriage $g^3$, which is movable laterally.

The two carriages $g^2$ and $g^3$ are retracted by springs $g^4$ and $g^5$, and are fed by the following means: A disk $g^6$, affixed to the shaft $f^5$, has a flange $g^7$, with a cam-depression $g^8$, and a lever $g^9$ carries a roller at its lower end, in engagement with the edge of said flange, while at its upper end it bears against the carriage $g^2$.

A cam $h$ is affixed to the shaft $f^5$, and a lever $h'$ bears at its lower end against said cam and at its upper end against the carriage $g^3$. When the lever $g^9$ is at the bottom of the depression $g^8$, the carriage $g^2$ is retracted to its limit, and the carrier-arm $b^{22}$ may pass down between the cutting-tool and the chuck. As the disk $g^6$ revolves, the inclined side of the depression, by engaging the lever $g^9$, causes the carriage $g^2$ to advance to the work; and, while the very slightly beveled end-portion of said inclined side acts against the lever, the tool is fed into the work to the depth of the recess to be made. The cam $h$, by acting against the lever $h'$, moves the carriage $g^3$ laterally and the tool through the radius of the recess.

As many of the carrying devices and recessing mechanisms of the construction described may be employed as necessary to complete the recessing of the plate. In the drawings, a carrier $i$ is shown to take the plate from the first recessing mechanism, and a second recessing mechanism $j$ is shown, to which the plate is taken by said carrier. A third carrier $k$ is also shown to take the plate from the recessing mechanism $j$ and carry it on.

The operation of the machine may be briefly described as follows: The barrel $a^2$ is stacked with blanks, in the manner described. The carrier $b^{22}$ is at the limit of its swing to the left, and its head $b^{23}$ is at the front of said barrel. The spindle $c$ is run backward and the chuck positioned to receive the plate, through the means described. The front blank is pushed out, and the carrier is drawn inward by the engagement of the cam-projection $b^{19}$ (see Fig. 21) with the lever $b^{18}$, and the said front blank is deposited on the pins of the head $b^{23}$; the carrier is then moved forward again, the lug $b^{19}$ having passed the lever $b^{18}$, and the shaft $b^6$ rocked to the right, and stops with the holes in the plate in line with the pins $c^4$. The carrier is again drawn back by the engagement of the second lug $b^{20}$ with the lever $b^{18}$, and takes the plate 2 toward the head $c^2$, the pins $b^{24}$ receding as the pins $c^4$ enter the holes 3 in the plate, and the plate spreading the catches $c^5$ until it passes the ends of the same and they snap over it. The carrier recedes and swings to the left to a vertical position (see Fig. 5), and maintains such position while the recessing is in progress, this being brought about by the formation of the cam-groove $b^2$ in the disk $b$. The plate having been taken by the chuck, the spindle is positively revolved, and the cutting-tool $g$ advances and enters the plate, cutting the depth of the recess, and then feeds laterally until the recess is completed. Then the tool recedes, and the spindle is run backward to position the plate for the carrier $i$, and said carrier swings down in front of the plate, while the carrier $b^{22}$ returns to position in front of the barrel $a^2$. The carrier $i$ is moved toward the chuck, and spreads the catches, and said carrier is then moved out again, while at the same time the pusher $d$ $d'$ in the spindle acts to push the plate out of the chuck. The carrier $i$ takes the plate to the next recessing mechanism $j$, whose chuck has been positioned to receive it, and at the same time the carrier $b^{22}$ takes another blank from the barrel $a^2$ to the first recessing mechanism.

The carrier $i$ is notched in the same manner and for the same purpose as the carrier $b^{23}$; but, when the carrier $i$ takes the plate from the chuck $c^2$, its position is such that the notches do not register with the catches, and the solid part of the carrier acts against the catches to spread them; whereas the change of position of said carrier, when it arrives at the chuck of the next recessing mechanism, brings its notches in line with the catches of this chuck, as desired.

As many recessing mechanisms and carriers may be provided as there are recesses to be made in the plate, and the carriers take the plate from one recesser to the next.

Some means for positioning the chuck of each recesser are made necessary from the fact that the center of the recess being cut in the plate must coincide with the center of rotation of the chuck, and the recesses are variously positioned.

It is evident that the invention may be carried out by other means than here shown, and hence is not limited to such means.

Having thus described my invention, what I claim as new, and desire to secure by Letters Patent, is—

1. The combination with a recessing lathe, having a rotary chuck or work-holder with provisions for receiving the work when said holder arrives at a predetermined point in its rotation, of a carrier which delivers the work at such point previously positioned to bring the center of the intended recess coincident with the lathe-center.

2. The combination with a recessing lathe, having a rotary chuck or work-holder with provisions for receiving the work when said holder arrives at a predetermined point in its rotation, of means for positioning the holder at such point in its rotation, and a carrier which delivers the work at such point previously positioned to bring the center of the intended recess coincident with the lathe-center.

3. The combination with a recessing lathe, having a rotary chuck or work-holder with provisions for receiving the work when said holder arrives at a predetermined point in its rotation, of a supply-receptacle having provisions for positively positioning the articles, and a carrier which conveys the work from said supply-receptacle and delivers it to the holder at the predetermined point in the rotation thereof and positioned to bring the center of the intended recess coincident with the lathe-center.

4. A machine of the character described, comprising in its construction a supply-receptacle; a plurality of recessing mechanisms each consisting of a rotatable holder or chuck and a tool-carriage, and having a pusher to remove the work from the holder; means for positively rotating the holder of each recessing mechanism in one direction and for frictionally rotating it in the opposite direction; a longitudinally movable and partially rotatable carrier to take the work from the supply-receptacle and convey it to the holder of the first recessing mechanism; means for stopping the holder from frictional rotation at the proper position to receive the work from the said carrier; a second longitudinally movable and partially rotatable carrier to convey the work from the holder of the first recessing mechanism to the holder of the second recessing mechanism; means for checking the holder of the first recessing mechanism under frictional rotation at the proper position for the second carrier to engage the work; and means for checking the holder of the second recessing mechanism at the proper position to receive the work from the second carrier.

In testimony whereof I have signed my name to this specification, in the presence of two subscribing witnesses, this 8th day of September, A. D. 1893.

DUANE H. CHURCH.

Witnesses:
A. D. HARRISON,
F. PARKER DAVIS.